US007779461B1

(12) United States Patent
Liu et al.

(10) Patent No.: US 7,779,461 B1
(45) Date of Patent: Aug. 17, 2010

(54) POINT-TO-MULTI-POINT/NON-BROADCASTING MULTI-ACCESS VPN TUNNELS

(75) Inventors: Changming Liu, Cupertino, CA (US); Choung-Yaw Shieh, San Jose, CA (US); Yonghui Cheng, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1642 days.

(21) Appl. No.: 10/988,835

(22) Filed: Nov. 16, 2004

(51) Int. Cl.
*G06F 9/00* (2006.01)
*G06F 15/16* (2006.01)
*G06F 17/00* (2006.01)

(52) U.S. Cl. .................... 726/15; 713/153
(58) Field of Classification Search ............... 726/255, 726/247, 15; 713/150
See application file for complete search history.

(56) References Cited

U.S. PATENT DOCUMENTS

| | | | | |
|---|---|---|---|---|
| 6,032,118 A * | 2/2000 | Tello et al. ............... 705/1.1 |
| 6,339,595 B1 * | 1/2002 | Rekhter et al. .............. 370/392 |
| 6,449,272 B1 * | 9/2002 | Chuah et al. ................. 370/389 |
| 6,463,061 B1 * | 10/2002 | Rekhter et al. .............. 370/392 |
| 6,584,500 B1 * | 6/2003 | Arkko ......................... 709/223 |
| 6,594,704 B1 * | 7/2003 | Birenback et al. .......... 709/238 |
| 6,614,791 B1 * | 9/2003 | Luciani et al. ......... 370/395.53 |
| 6,636,516 B1 * | 10/2003 | Yamano ................. 370/395.52 |
| 6,636,520 B1 * | 10/2003 | Jason et al. .................. 370/401 |
| 6,693,878 B1 * | 2/2004 | Daruwalla et al. .......... 370/235 |
| 6,717,944 B1 * | 4/2004 | Bryden et al. ............... 370/392 |
| 7,023,879 B1 * | 4/2006 | Sitaraman et al. ........... 370/466 |
| 7,068,624 B1 * | 6/2006 | Dantu et al. ................. 370/331 |
| 7,111,163 B1 * | 9/2006 | Haney ......................... 713/153 |
| 7,116,665 B2 * | 10/2006 | Balay et al. ................. 370/392 |
| 7,154,889 B1 * | 12/2006 | Rekhter et al. .............. 370/392 |
| 7,174,388 B2 * | 2/2007 | Luciani et al. .............. 709/238 |
| 7,280,534 B2 * | 10/2007 | Koppol ........................ 370/352 |
| 7,307,990 B2 * | 12/2007 | Rosen et al. ................. 370/392 |
| 7,317,717 B2 * | 1/2008 | Pankajakshan et al. ...... 370/352 |
| 7,318,152 B2 * | 1/2008 | Haney ......................... 713/153 |
| 7,366,188 B2 * | 4/2008 | Kim ............................ 370/401 |
| 7,366,894 B1 * | 4/2008 | Kalimuthu et al. .......... 713/153 |
| 7,369,556 B1 * | 5/2008 | Rekhter et al. .............. 370/392 |
| 7,478,427 B2 * | 1/2009 | Mukherjee et al. ............ 726/15 |
| 7,486,659 B1 * | 2/2009 | Unbehagen et al. ......... 370/351 |
| 7,509,491 B1 * | 3/2009 | Wainner et al. ............. 713/163 |
| 7,523,218 B1 * | 4/2009 | Sahni et al. ................. 709/238 |
| 7,570,644 B2 * | 8/2009 | Dietrich ...................... 370/392 |
| 7,574,738 B2 * | 8/2009 | Daude et al. .................. 726/15 |
| 7,623,500 B2 * | 11/2009 | Riittinen et al. ............. 370/338 |
| 7,626,984 B2 * | 12/2009 | Napierala .................... 370/389 |
| 7,680,943 B2 * | 3/2010 | Conta et al. ................. 709/230 |
| 2003/0041170 A1 * | 2/2003 | Suzuki ........................ 709/238 |
| 2003/0088699 A1 * | 5/2003 | Luciani et al. .............. 709/243 |
| 2003/0110276 A1 * | 6/2003 | Riddle ......................... 709/230 |

(Continued)

*Primary Examiner*—David Garcia Cervetti
(74) *Attorney, Agent, or Firm*—Harrity & Harrity, LLP

(57) ABSTRACT

A system establishes a virtual private network (VPN) tunnel to a destination and determines a next hop for the VPN tunnel. The system inserts the next hop, and an address associated with the destination, into an entry of a first table. The system inserts the next hop, and a tunnel identifier corresponding to the established VPN tunnel, into an entry of a second table. The system associates one or more security parameters, used to encrypt traffic sent via the VPN tunnel, with the tunnel identifier.

39 Claims, 8 Drawing Sheets

U.S. PATENT DOCUMENTS

| | | | |
|---|---|---|---|
| 2004/0059829 A1* | 3/2004 | Chu et al. | 709/238 |
| 2004/0088542 A1* | 5/2004 | Daude et al. | 713/156 |
| 2004/0093492 A1* | 5/2004 | Daude et al. | 713/156 |
| 2004/0095947 A1* | 5/2004 | Luciani et al. | 370/410 |
| 2004/0215919 A1* | 10/2004 | Emmes | 711/208 |
| 2004/0218611 A1* | 11/2004 | Kim | 370/401 |
| 2004/0223499 A1* | 11/2004 | Sanderson et al. | 370/395.52 |
| 2004/0225895 A1* | 11/2004 | Mukherjee et al. | 713/201 |
| 2005/0025143 A1* | 2/2005 | Chen et al. | 370/389 |
| 2005/0086367 A1* | 4/2005 | Conta et al. | 709/238 |
| 2005/0094577 A1* | 5/2005 | Ashwood-Smith | 370/257 |
| 2005/0105519 A1* | 5/2005 | Koppol | 370/386 |
| 2005/0188194 A1* | 8/2005 | Fascenda | 713/155 |
| 2006/0002304 A1* | 1/2006 | Ashwood-Smith | 370/238 |
| 2006/0013211 A1* | 1/2006 | Deerman et al. | 370/389 |
| 2006/0088031 A1* | 4/2006 | Nalawade | 370/390 |
| 2006/0187942 A1* | 8/2006 | Mizutani et al. | 370/401 |
| 2007/0053328 A1* | 3/2007 | Riittinen et al. | 370/338 |

* cited by examiner

ROUTING TABLE
300

| DEST. NETWORK 310 | NEXT HOP 315 | OUTGOING I/F 320 |
|---|---|---|
| 120-2 | 105-2 | tunnel_I/F |
| 120-3 | 105-3 | tunnel_I/F |
| 120-N | 105-N | tunnel_I/F |

TABLE ENTRIES 305

FIG. 3

NEXT HOP TUNNEL TABLE (NHTT)
400

| NEXT HOP 315 | TUNNEL 410 |
|---|---|
| 105-2 | tunnel_1 |
| 105-3 | tunnel_2 |
| 105-N | tunnel_N |

TABLE ENTRIES 405

FIG. 4

| PAYLOAD TYPE 505 |
| SPI 510 |
| ATTRIBUTES 515 |

US 7,779,461 B1

POINT-TO-MULTI-POINT/NON-BROADCASTING MULTI-ACCESS VPN TUNNELS

BACKGROUND OF THE INVENTION

1. Field of the Invention

The principles of the invention relate generally to networks, and more particularly, to point-to-multi-point or non-broadcasting multi-access virtual private network (VPN) tunnels in networks.

2. Description of Related Art

The advent and rise of the Internet has permitted the widespread use of electronic forms of communication across vast distances at high speed. The widespread use of electronic forms of communication has resulted in the need to protect the security of such communications from unauthorized monitoring. To provide security across local area networks (LANs), private and public wide area networks (WANs), and the Internet, Internet Protocol Security (IPsec) has been developed. IPsec protocols may operate in networking devices, such as a router or a firewall, that connect each LAN to the "outside world." IPsec typically encrypts all traffic going into a WAN, and decrypts traffic coming from the WAN.

IPsec conventionally produces virtual private network (VPN) tunnels that include point-to-point links. Applications that require a point-to-multi-point (PTMP), or non-broadcasting multi-access (NBMA), environment typically cannot run over IPsec tunnels directly. To provide PTMP service, existing techniques, such as generic routing encapsulation (GRE) tunneling, have developed a protocol layer between upper protocol layers and IPsec tunnels. Such techniques, however, require applicable support (e.g., GRE support) on all participating networking devices, and also introduce the overhead of GRE.

SUMMARY OF THE INVENTION

One aspect consistent with principles of the invention is directed to a method that may include establishing a virtual private network (VPN) tunnel to a destination and determining a next hop for the VPN tunnel. The method may further include inserting the next hop, and an address range associated with the destination, into an entry of a first table and inserting the next hop, and a tunnel identifier corresponding to the established VPN tunnel, into an entry of a second table. The method may also include associating one or more security parameters, used to encrypt traffic sent via the VPN tunnel, with the tunnel identifier.

A second aspect consistent with principles of the invention is directed to a method that may include receiving a data unit and performing a route lookup to retrieve a next hop identifier from a routing table that corresponds to a destination of the data unit. The method may further include retrieving a tunnel identifier from a second table using the retrieved next hop identifier and forwarding the data unit via a tunnel corresponding to the tunnel identifier.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

FIG. 3 is a diagram of an exemplary routing table consistent with principles of the invention;

FIG. 4 is a diagram of an exemplary next hop tunnel table consistent with principles of the invention;

DETAILED DESCRIPTION

The following detailed description of embodiments of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention "bind" multiple VPN tunnels, such as, for example, IPsec VPN tunnels, to a tunnel interface in a network device, such as, for example, a gateway. According to one aspect, a next hop tunnel table, that maps a next hop, retrieved from a routing table, along a VPN tunnel to a destination network. Traffic routed to a specific next hop via the routing table may be directed to an appropriate VPN tunnel in accordance with the next hop tunnel table. Broadcast, multicast, or unicast data units may, thus, be routed via appropriate VPN tunnels toward the destinations associated with the data units. Aspects of the invention thus may provide PTMP, or non-broadcasting multi-access (NBMA), functionality without changing existing routing tables, or existing VPN tunnels.

Exemplary Network

Figure 1:
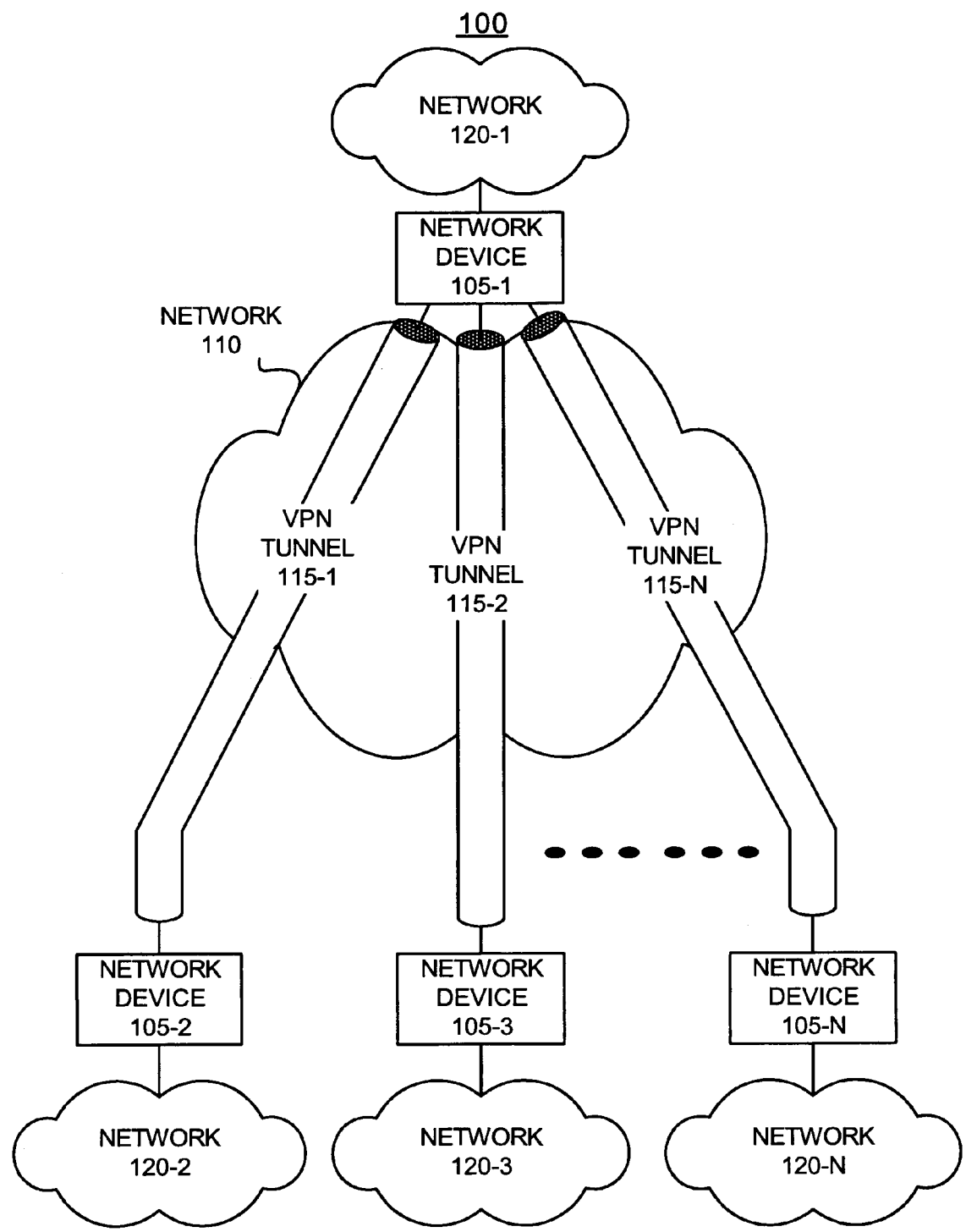
FIG. 1 is a diagram of an exemplary network consistent with principles of the invention.

FIG. 1 illustrates an exemplary network 100 in which systems and methods, consistent with principles of the invention, may forward data from one network to another network via virtual private network (VPN) tunnels. Network 100 may include network devices 105-1, 105-2, 105-3 and 105-N (collectively referred to as network devices 105), interconnected via a sub-network 110. Network devices 105 may include gateways, routers, or other types of network devices. As shown in FIG. 1, network device 105-1 may interconnect with network devices 105-2, 105-3 and 105-N via VPN tunnels 115-1, 115-2 and 115-N (collectively referred to as VPN tunnels 115), respectively. Sub-network 120-1 may interconnect with network device 105-1, sub-network 120-2 may interconnect with network device 105-2, sub-network 120-3 may interconnect with network device 105-3, and sub-network N 120-N may interconnect with network device 105-N.

Sub-network 110 and sub-networks 120-1 through 120-N (collectively referred to as sub-networks 120) may include one or more networks of any type, including, for example, a local area network (LAN), a metropolitan area network (MAN), a satellite network, a cable network, an Internet, or intranet. Sub-networks 120-1 through 120-N may also include private networks that reside behind "firewalls" implemented in respective network devices 105-1 through 105-N.

Each VPN tunnel 115-1 through 115-N may pass encrypted traffic to and from network device 105-1. Each data unit sent via VPN tunnels 115 may be encrypted and encapsulated with a header that permits routing of the data unit from a source to a destination.

The number of elements illustrated in FIG. 1 are provided for explanatory purposes only. A typical network may include more or fewer elements than are illustrated in FIG. 1 and may be configured differently.

Exemplary Network Device

Figure 2:
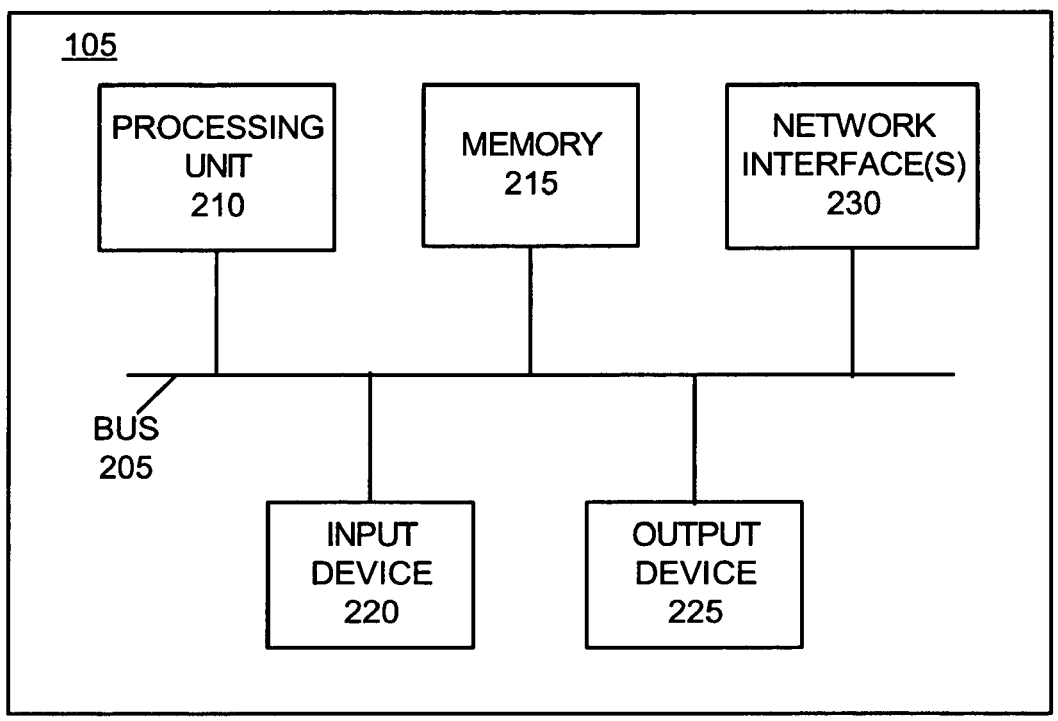
FIG. 2 is a diagram of an exemplary network device consistent with principles of the invention.

FIG. 2 illustrates exemplary components of a network device 105 consistent with principles of the invention. Network device 105 may include a bus 205, a processing unit 210, a memory 215, an input device 220, an output device 225, and a network interface(s) 230. Bus 205 may include a path that permits communication among the components of network device 105. Processing unit 210 may include any type of software, firmware or hardware implemented processing device, such as a microprocessor, a field programmable gate array (FPGA), combinational logic, etc. Memory 215 may include a random access memory (RAM) or another type of dynamic storage device that stores information and instructions for execution by processing unit 210, if processing unit 210 includes a microprocessor. Memory 215 may also, or alternatively, include a conventional ROM device or another type of static storage device that stores static information and/or instructions for use by processing unit 210. Memory 215 may further, or alternatively, include a magnetic and/or optical recording medium and its corresponding drive.

Input device 220 may include a conventional mechanism that permits an operator to input information to network device 105, such as a keyboard, a mouse, a pen, voice recognition and/or other biometric mechanisms, etc. Output device 225 may include a conventional mechanism that outputs information to an operator, including a display, a printer, a speaker, etc. Network interface(s) 230 may include any transceiver-like mechanism(s) that enables network device 105 to communicate with other devices and/or systems. For example, network interface(s) 230 may include mechanisms for communicating with another device or system via a network, such as sub-network 110.

As will be described in detail below, network device 105, consistent with the principles of the invention, may perform certain VPN tunnel establishment, and data unit forwarding, operations. Network device 105 may, in some implementations, perform these operations in response to processing unit 210 executing software instructions contained in a computer-readable medium, such as memory 215. A computer-readable medium may be defined as one or more physical or logical memory devices and/or carrier waves.

The software instructions may be read into memory 215 from another computer-readable medium, or from another device via network interface(s) 230. The software instructions contained in memory 215 may cause processing unit 210 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Routing Table

FIG. 3 illustrates an exemplary routing table 300, associated with a network device 105, consistent with the principles of the invention. Routing table 300 may include one or more table entries 305, each of which may include a destination network identifier 310, a next hop identifier 315 and an outgoing interface identifier 320. Destination network identifier 310 may include a network address, or range of network addresses, associated with sub-networks 120 that may be destinations of traffic from a given network device 105. Next hop identifier 315 may identify a network address of a next hop for traffic along a path to a respective destination network 310. Outgoing interface identifier 320 may identify a logical tunnel interface for forwarding encrypted VPN traffic intended for a respective destination network. FIG. 3 illustrates exemplary values in table entries 305 for purposes of illustration only. Each network device 105 in network 100 may be associated with its own routing table 300 and have different values in each of the table entries 305 than those shown in FIG. 3.

Exemplary Next Hop Tunnel Table

FIG. 4 illustrates an exemplary next hop tunnel table (NHTT) 400, associated with a network device 105, consistent with principles of the invention. NHTT table 400 may include one or more table entries 405, each of which may include a next hop identifier 315 and a tunnel identifier 410. Next hop identifier 315 may identify a network address of a next hop for traffic along a path to a respective destination network. Tunnel identifier 410 may identify a VPN tunnel for VPN traffic forwarded to respective next hop 315. A security parameter, not shown, may be associated with each tunnel identifier 410. The security parameter, such as an IP security (IPsec) security parameters index (SPI) enables network device 105 to select a security association under which a data unit received from a given source may be processed.

FIG. 4 illustrates exemplary values in table entries 405 for purposes of illustration only. Each network device 105 in network 100 may be associated with its own next hop tunnel table 400 and have different values in each of the table entries 405 than those shown in FIG. 4.

Exemplary "Notify" Message

Figure 5:
FIG. 5 is a diagram of an exemplary message for providing notification of a network device's tunnel interface network address.

FIG. 5 illustrates an exemplary message 500, consistent with principles of the invention, that may be used by a network device 105 to inform other network devices of a network address associated with the network device 105's VPN tunnel interface. "Notify" message 500 may include a payload type 505, a security parameters index (SPI) 510, and attributes 515.

Payload type 505 may identify message 500 as a "notify" message that may inform other network devices of a network address associated with a network device's VPN tunnel interface. SPI 510 may identify an IP security (IPsec) security parameters index (SPI) that enables a network device to select a security association under which a data unit received from a given source may be processed. Attributes 525 may identify a network address of the VPN tunnel interface for a network device that originated message 500.

Exemplary VPN Tunnel Establishment Process

Figure 6:
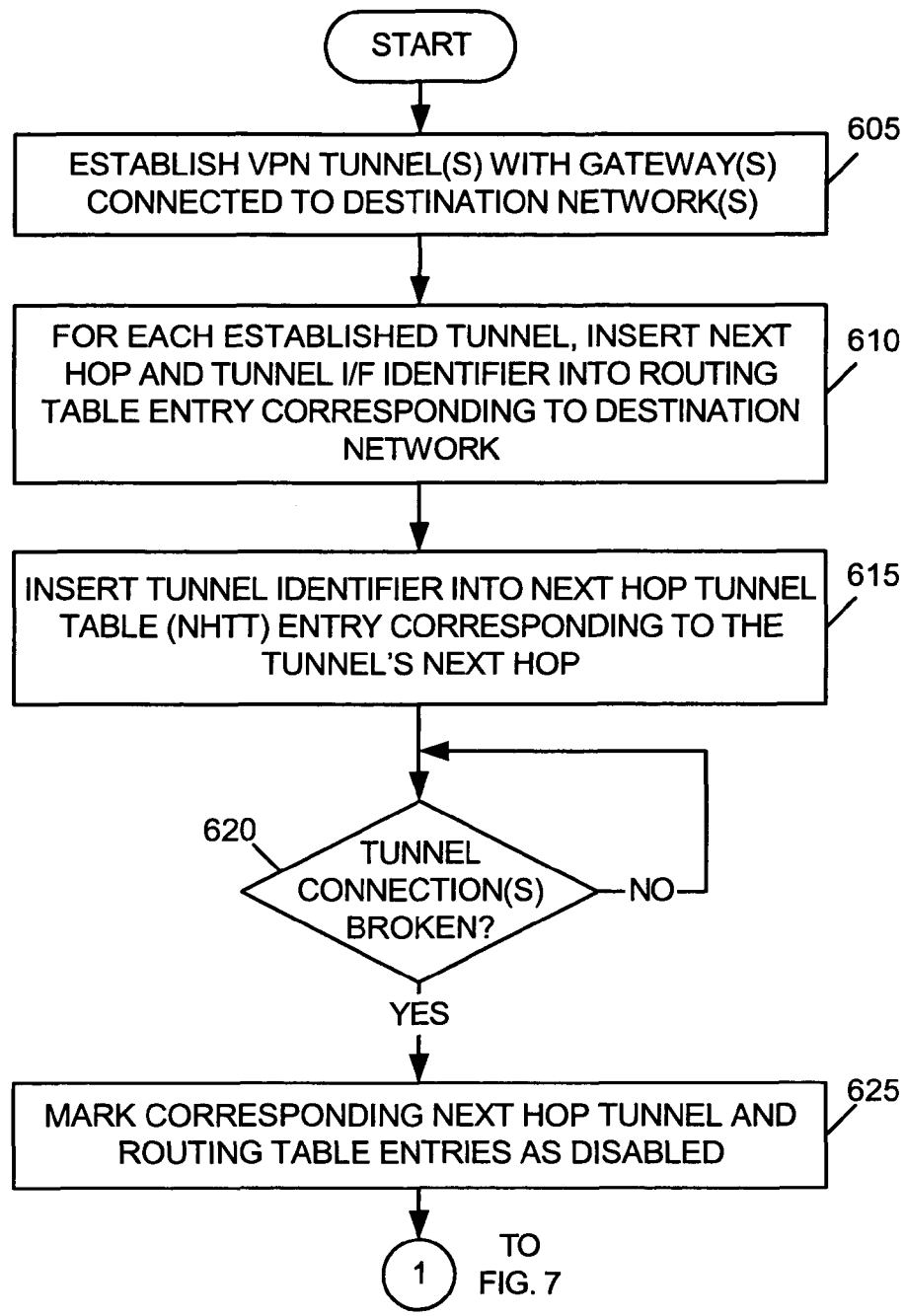
FIGS. 6-7 are flowcharts of an exemplary process for establishing virtual private network tunnels according to an implementation consistent with principles of the invention.
Figure 7:
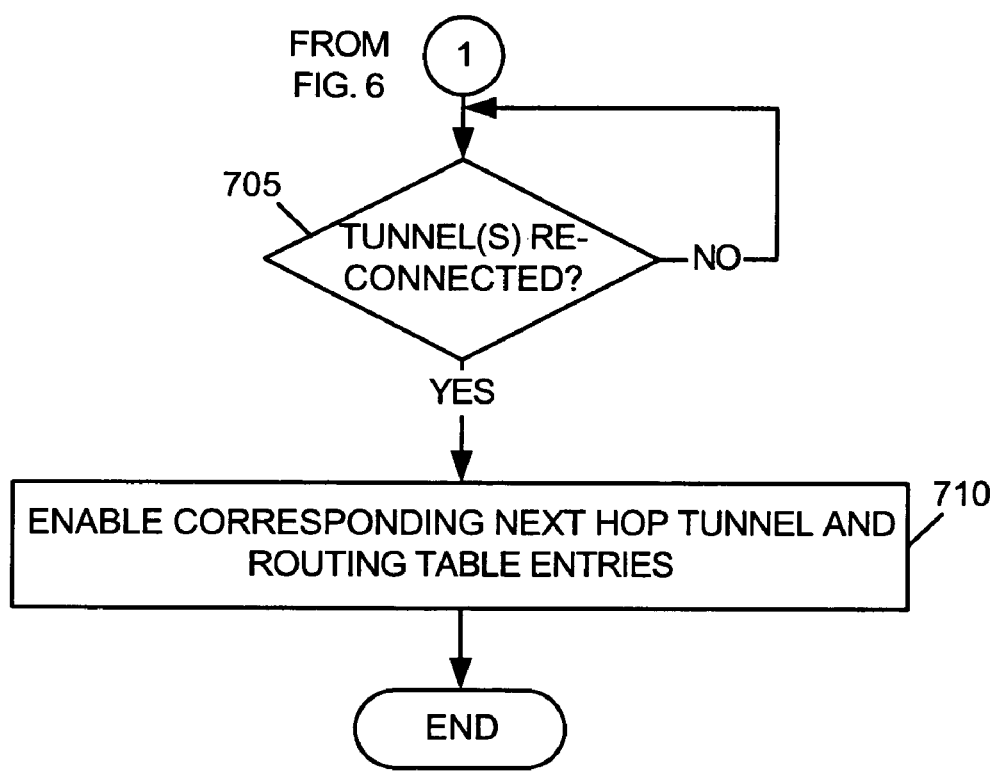

FIGS. 6-7 are flowcharts that illustrate an exemplary process, consistent with principles of the invention, for establishing a VPN tunnel between network devices. The exemplary process of FIGS. 6-7 may be implemented in software, hardware or firmware in a network device 105, or in any combination of software, hardware or firmware.

The exemplary process may begin with the establishment of a VPN tunnel(s) with another network device(s) connected to a sub-network(s) that may be a destination(s) for VPN traffic from network device 105 (act 605)(FIG. 6). Tunnel establishment may include transmission of a "notify" message 500 from each network device in a path along a VPN tunnel informing another network device at the other end of a VPN tunnel of the first network device's VPN tunnel interface address. In some implementations, however, NHTT 400 may be manually updated, and transmission of a "notify" message 500 may not be required. Establishment of the VPN tunnel may include employing conventional security protocols, such as those implemented in IPsec. For each established tunnel, a next hop identifier and tunnel interface (I/F) identifier may be inserted into an entry of routing table 300 that corresponds to a destination network (act 610). For example, as shown in FIG. 3, a next hop identifier identifying network device 105-2 may be inserted into the table entry 305 corresponding to destination network 120-2, and a tunnel interface identifier, associated with the outgoing tunnel, may be inserted into the same table entry. A tunnel identifier may then be inserted in the next hop tunnel table 400 entry that corresponds to the tunnel's next hop (act 615). For example, as shown in FIG. 4, a tunnel identifier (tunnel_1) 410 corresponding to VPN tunnel 115-1 may be inserted into table entry 405 corresponding to next hop 315 of network device 105-2.

A determination may be made whether a tunnel connection(s) has been broken (act 620). A tunnel connection may be broken for any number of reasons, including, for example, transmission failure of data units across the VPN tunnel. Such transmission failure may occur due to, for example, temporary or permanent failure of a network device at one end of the VPN tunnel. In one implementation, the tunnel connection(s) may be periodically tested to determine if it has been broken. If a tunnel connection has been broken, corresponding entries of the next hop tunnel table 400 and routing table 300 may be marked as disabled (act 625). Marking corresponding entries of tables 300 and 400 as disabled may include, for example, setting a disabled flag associated with a respective entry.

A determination may be made whether the tunnel(s) has been re-connected (act 705)(FIG. 7). VPN tunnel re-connection may occur, for example, when a network device at one end of a VPN tunnel regains operational status after a temporary failure. The tunnel(s) may, for example, be periodically checked to see if it has been re-connected. If the tunnel(s) has been re-connected, corresponding entries of next hop tunnel table 400 and routing table 300 may be enabled (act 710). Marking corresponding entries of tables 300 and 400 as enabled may include, for example, resetting a disabled flag associated with a respective entry.

Exemplary VPN Tunnel Data Unit Forwarding Process

Figure 8:
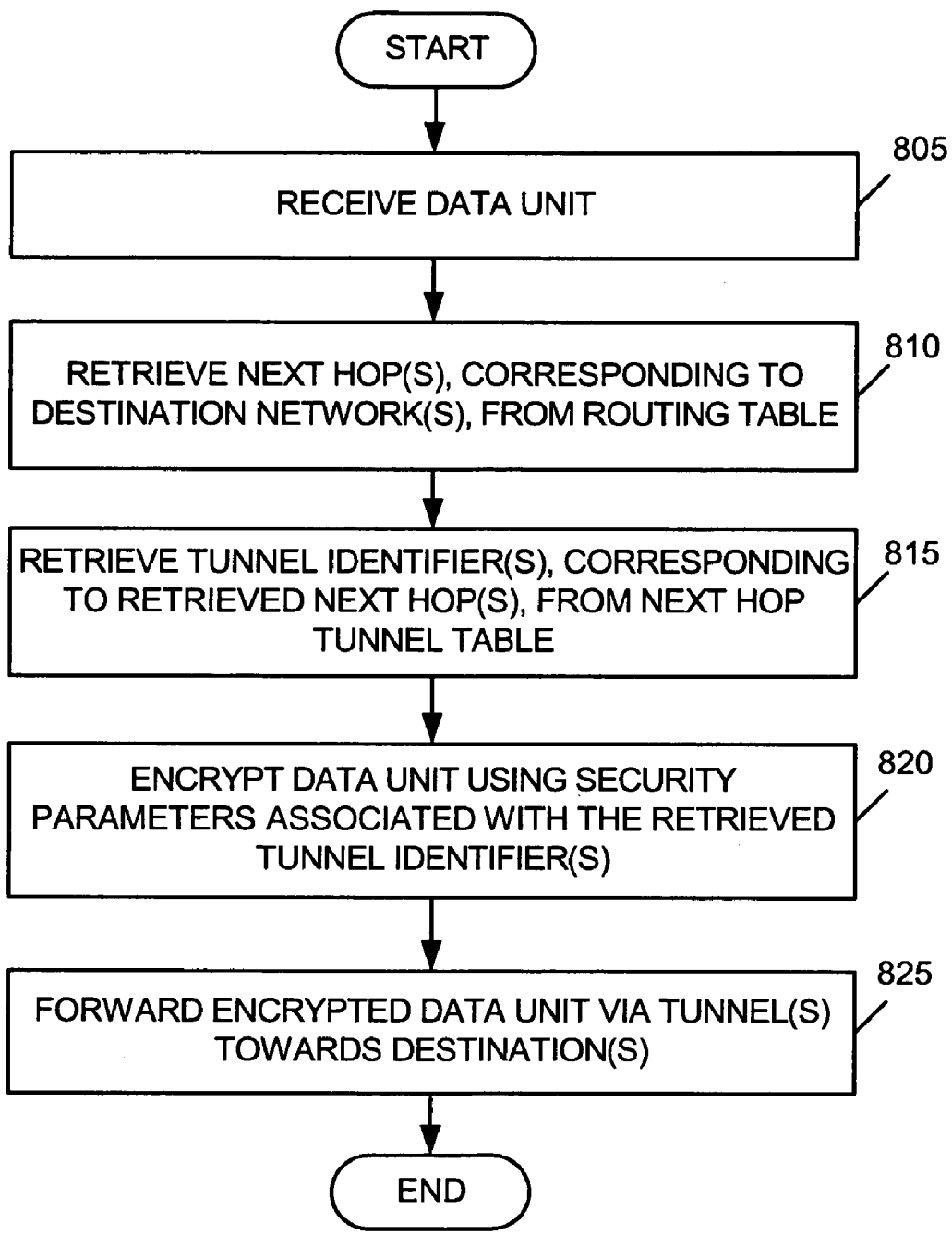
FIG. 8 is a flowchart of an exemplary process for forwarding a data unit via a virtual private network tunnel according to an implementation consistent with principles of the invention.

FIG. 8 is a flowchart that illustrates an exemplary process, consistent with principles of the invention, for using next hop tunnel table 400 to forward a data unit via a VPN tunnel. The exemplary process of FIG. 8 may be implemented in software, hardware or firmware in a network device 105, or in any combination of software, hardware or firmware.

The exemplary process may begin the receipt of a data unit (act 805)(FIG. 8). A received data unit may include a packet, cell, datagram, a fragment of a packet, datagram or cell, a database record, or other types of data. The received data unit may correspond to a stream of data units (e.g., a session) received from a source and intended for a destination. The received data unit may include network address information indicating a source and one or more destinations of the data unit (i.e., the data unit may be unicast, broadcast, or multicast). For example, a stream of data units sent from a source connected to sub-network 120-1 may be received at network device 105-1. A next hop, corresponding to the destination network for the data unit, may be retrieved from routing table 300 (act 810). If the data unit is broadcast, or multicast, then a next hop, corresponding to each destination network, may be retrieved from routing table 300. The destination network may be determined from the destination address included in the received data unit. As an example, a next hop identifier 315 corresponding to network device 105-2 may be retrieved from routing table 300 for a data unit received at network device 105-1 and destined for a destination connected to sub-network 120-2.

A tunnel identifier, corresponding to the retrieved next hop, may be retrieved from next hop tunnel table 400 (act 815). For example, the next hop identifier 315 retrieved from routing table 300 may be used as an index into next hop tunnel table 400 to retrieve a tunnel identifier 410 corresponding to VPN tunnel 115-1. If the data unit is broadcast, or multicast, then a tunnel identifier, corresponding to each retrieved next hop, may be retrieved from routing table 300. The received data unit may then be encrypted using security parameters associated with the retrieved tunnel identifier(s) (act 820). The security parameters may include, for example, an IPsec SPI that enables network device 105 to select a security association used to encrypt the received data unit. The encrypted data unit may be forwarded via the VPN tunnel(s) towards the data unit destination(s) (act 825).

Figure 9:
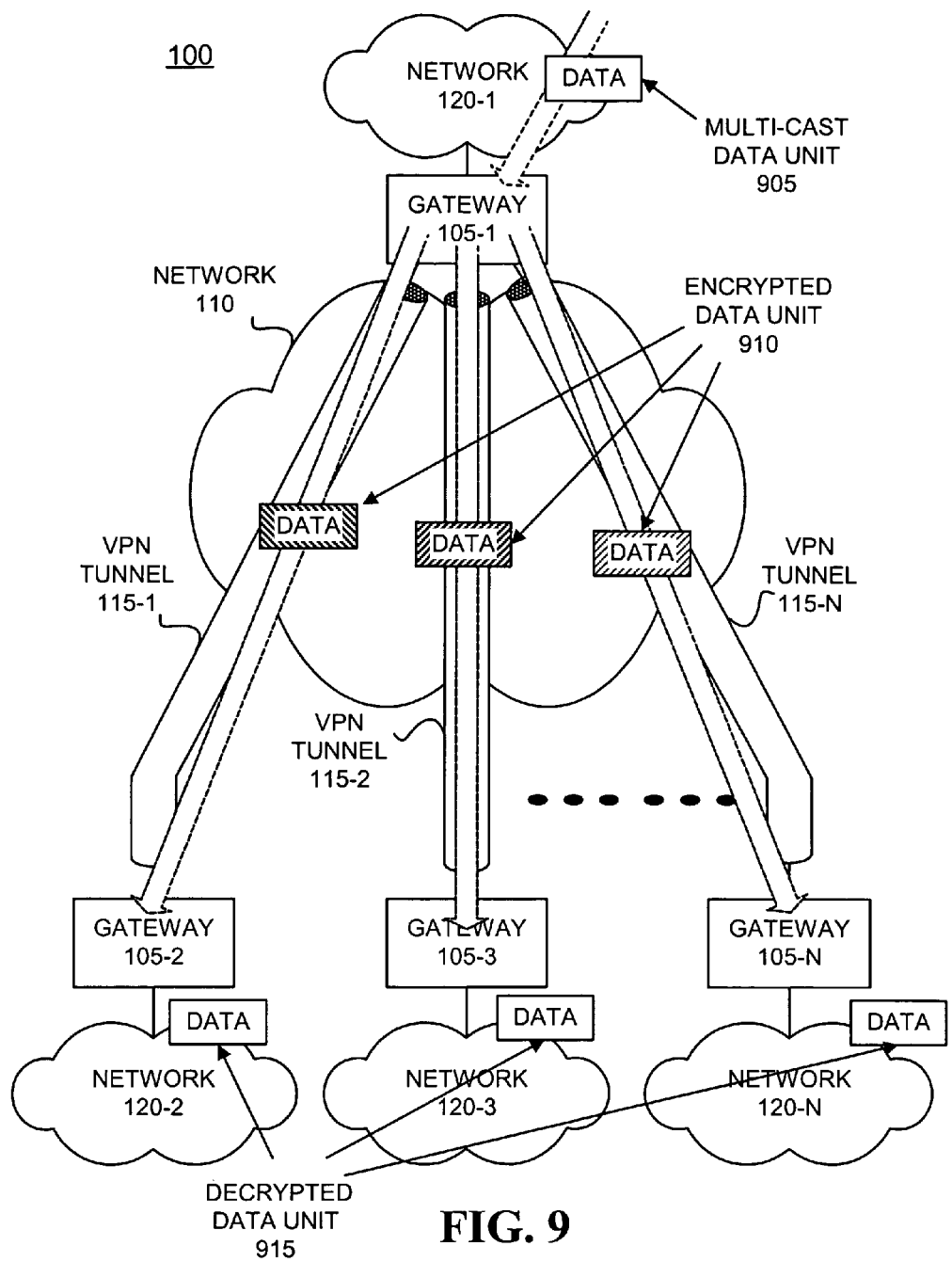
FIG. 9 illustrates exemplary multicast data unit forwarding via VPN tunnels consistent with one aspect of the invention.

FIG. 9 illustrates an exemplary aspect of the invention in which a data unit 905 is multi-cast to multiple destinations connected to networks 120-2, 120-3 and 120-N. An encrypted version 910 of data unit 905 is forwarded from network device 105-1 to network device 105-2 via VPN tunnel 115-1 using an IPsec SPI associated with tunnel 115-1. An encrypted version 910 of data unit 905 is forwarded from network device 105-1 to network device 105-3 via VPN tunnel 115-2 using an IPsec SPI associated with tunnel 115-2. An encrypted version 910 of data unit 905 is forwarded from network device 105-1 to network device 105-N via VPN tunnel 115-N. Network device 105-2, using the SPI associated with tunnel 115-1, may decrypt encrypted data unit 910 and forward a decrypted data unit 915 on to a destination connected to network 120-2. Network device 105-3, using the SPI associated with tunnel 115-2, may decrypt encrypted data unit 910 and forward a decrypted data unit 915 on to a destination connected to network 120-3. Network device 105-N, using the SPI associated with tunnel 115-N, may decrypt encrypted data unit 910 and forward a decrypted data unit 915 on to a destination connected to network 120-N.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described in FIGS. 6-8, the order of the acts may vary in other implementations consistent with the present invention. Also, non-dependent acts may be performed in parallel. Furthermore, while tables 300 and 400 have been described as separate tables, they could be combined into one table.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A network device, comprising:
a memory to store at least one data table; and
a processing unit to:
establish a virtual private network (VPN) tunnel to a destination,
determine a next hop for the VPN tunnel,
insert an identifier associated with the next hop, and an address range associated with the destination, into the at least one data table,
insert a tunnel identifier corresponding to the established VPN tunnel into the at least one data table, and
associate one or more security parameters, used to encrypt traffic sent via the VPN tunnel, with the tunnel identifier.

2. The network device of claim 1, where the processing unit is further to:
establish a second virtual private network (VPN) tunnel to a second destination,
determine a next hop for the second VPN tunnel,
insert an identifier associated with the next hop for the second VPN tunnel, and an address range associated with the second destination, into the at least one data table,
insert a second tunnel identifier corresponding to the established second VPN tunnel into the at least one data table, and
associate one or more security parameters, used to encrypt traffic sent via the second VPN tunnel, with the second tunnel identifier.

3. The network device of claim 1, where the destination comprises a private network.

4. The network device of claim 3, where the next hop comprises another network device connected to the private network.

5. The network device of claim 1, where the one or more security parameters comprises an Internet Protocol security (IPsec) security parameters index (SPI).

6. The network device of claim 1, further comprising:
an interface to:
receive a data unit;
where the processing unit is further to:
retrieve a destination network identifier from the data unit,
identify the next hop from the at least one data table using the destination network identifier retrieved from the data unit,
retrieve the tunnel identifier from the at least one data table using the retrieved next hop,
encrypt the data unit using the security parameters associated with the identified tunnel identifier, and
forward the encrypted data unit via the VPN tunnel.

7. A method, performed by a processor, the method comprising:
establishing, by the processor, a virtual private network (VPN) tunnel to a destination;
determining, by the processor, a next hop for the VPN tunnel;
inserting, by the processor, an identifier associated with the next hop, and an address range associated with the destination, into an entry of a first table;
inserting, by the processor, the identifier associated with the next hop, and a tunnel identifier corresponding to the established VPN tunnel, into an entry of a second table; and
associating, by the processor, one or more security parameters, used to encrypt traffic sent via the VPN tunnel, with the tunnel identifier.

8. The method of claim 7, further comprising:
establishing a second virtual private network (VPN) tunnel to a second destination;
determining a next hop for the second VPN tunnel;
inserting an identifier associated with the next hop for the second VPN tunnel, and an address range associated with the second destination, into another entry of the first table;
inserting the identifier associated with the next hop for the second VPN tunnel, and a second tunnel identifier corresponding to the established second VPN tunnel, into another entry of the second table; and
associating one or more security parameters, used to encrypt traffic sent via the second VPN tunnel, with the second tunnel identifier.

9. The method of claim 7, where the destination comprises a private network.

10. The method of claim 9, where the next hop comprises a network device connected to the private network.

11. The method of claim 7, where the one or more security parameters comprises an Internet Protocol security (IPsec) security parameters index (SPI).

12. The method of claim 7, further comprising:
determining if the VPN tunnel has been broken; and
disabling the entry in the second table if the VPN tunnel has been broken.

13. The method of claim 12, further comprising:
determining if the VPN tunnel has been re-connected; and
enabling the entry in the second table if the VPN tunnel has been re-connected.

14. The method of claim 7, further comprising:
receiving a data unit;
retrieving a destination network identifier from the data unit;
retrieving the identifier associated with the next hop from the first table using the destination network identifier retrieved from the data unit;
retrieving the tunnel identifier from the second table using the retrieved identifier associated with the next hop;
encrypting the data unit using the security parameters associated with the retrieved tunnel identifier; and
forwarding the encrypted data unit via the VPN tunnel.

15. A system, comprising:
a memory to store a first data table and a second data table;
a processing unit to:
establish a virtual private network (VPN) tunnel to a destination,
determine a next hop for the VPN tunnel,
insert an identifier associated with the next hop, and an address range associated with the destination, into an entry of the first data table, insert the identifier associated with the next hop, and a tunnel identifier corresponding to the established VPN tunnel, into an entry of the second data table, and associate one or more security parameters, used to encrypt traffic sent via the VPN tunnel, with the tunnel identifier.

16. The system of claim 15, where the processing unit is further to:

establish a second virtual private network (VPN) tunnel to a second destination;

determine a next hop for the second VPN tunnel;

insert an identifier associated with the next hop for the second VPN tunnel, and an address range associated with the second destination, into another entry of the first table;

insert the identifier associated with the next hop for the second VPN tunnel, and a second tunnel identifier corresponding to the established second VPN tunnel, into another entry of the second table; and associate one or more security parameters, used to encrypt traffic sent via the second VPN tunnel, with the second tunnel identifier.

17. The system of claim 15, where the destination comprises a private network.

18. The system of claim 17, where the next hop comprises a network device connected to the private network.

19. The system of claim 15, where the one or more security parameters comprises an Internet Protocol security (IPsec) security parameters index (SPI).

20. The system of claim 15, further comprising:
determining if the VPN tunnel has been broken; and
disabling the entry in the second table if the VPN tunnel has been broken.

21. The system of claim 20, further comprising:
determining if the VPN tunnel has been re-connected; and
enabling the entry in the second table if the VPN tunnel has been re-connected.

22. The system of claim 15, further comprising:
an interface to:
  receive a data unit;
where the processing unit is further to:
  retrieve a destination network identifier from the data unit,
  retrieve the identifier associated with the next hop from the first table using the destination network identifier retrieved from the data unit,
  retrieve the tunnel identifier from the second table using the retrieved identifier associated with the next hop,
  encrypt the data unit using the security parameters associated with the retrieved tunnel identifier, and
  forward the encrypted data unit via the VPN tunnel.

23. A method, performed by a device, comprising:
receiving, at a processor of the device, a data unit;
performing, by the processor, a route lookup to retrieve a next hop identifier from a routing table that corresponds to a destination of the data unit;
retrieving, by the processor, a tunnel identifier from a second table using the retrieved next hop identifier;
forwarding, by the processor, the data unit via a tunnel corresponding to the tunnel identifier, where the tunnel comprises a virtual private network (VPN) tunnel; and
encrypting the data unit using security parameters associated with the tunnel identifier.

24. The method of claim 23, where performing a route lookup comprises:
indexing the routing table using a network identifier associated with the destination of the data unit to retrieve the next hop identifier.

25. The method of claim 23, where retrieving a tunnel identifier from the second table comprises:
indexing the second table using the retrieved next hop identifier to retrieve the tunnel identifier.

26. The method of claim 23, where the next hop identifier comprises a network address associated with a network device.

27. The method of claim 26, where the network device is at one end of the tunnel.

28. The method of claim 23, where the destination comprises a private network.

29. The method of claim 28, where the next hop identifier is associated with a network device connected to the private network.

30. A system, comprising:
a memory to store a first table and a second table;
an interface to:
  receive a data unit; and
a processing unit to:
  perform a route lookup to retrieve a next hop identifier from the first table that corresponds to a destination of the data unit,
  retrieve a virtual private network (VPN) tunnel identifier from the second table using the retrieved next hop identifier,
  forward the data unit via a VPN tunnel corresponding to the VPN tunnel identifier, and
  encrypt the data unit using security parameters associated with the VPN tunnel identifier.

31. The system of claim 30, where performing a route lookup comprises:
indexing the routing table using a network identifier associated with the destination of the data unit to retrieve the next hop identifier.

32. The system of claim 30, where retrieving a tunnel identifier from the second table comprises:
indexing the second table using the retrieved next hop identifier to retrieve the tunnel identifier.

33. The system of claim 30, where the next hop identifier comprises a network address associated with a network device.

34. The system of claim 33, where the network device is at one end of the tunnel.

35. The system of claim 30, where the destination comprises a private network.

36. The system of claim 35, where the next hop identifier is associated with a network device connected to the private network.

37. A system, comprising:
means for establishing a virtual private network (VPN) tunnel to a destination;
means for determining a next hop for the VPN tunnel;
means for inserting an identifier associated with the next hop, and an address range associated with the destination, into a first entry of a first table;
means for inserting the identifier associated with the next hop, and a tunnel identifier corresponding to the established VPN tunnel, into a second entry of a second table; and
means for associating one or more security parameters, used to encrypt traffic sent via the VPN tunnel, with the tunnel identifier.

38. A network device, comprising:
a data structure that comprises:
- a first data table comprising an identifier associated with a first next hop along a first virtual private network (VPN) tunnel to a first destination indexed to an address range associated with the first destination, and
- a second data table comprising a first tunnel identifier, corresponding to the first VPN tunnel, indexed to the identifier associated with the first next hop; and a processor to:
- retrieve the first tunnel identifier from the second table, and
- forward a data unit via a VPN tunnel corresponding to the first tunnel identifier.

39. The network device of claim 38, where the first data table further comprises an identifier associated with a second next hop along a second virtual private network (VPN) tunnel to a second destination indexed to an address range associated with the second destination, and
- where the second data table comprises a second tunnel identifier, corresponding to the second VPN tunnel, indexed to the identifier associated with the second next hop.

\* \* \* \* \*